United States Patent Office 3,475,533
Patented Oct. 28, 1969

3,475,533
WATER-FREE TOOTHPASTES CONTAINING METAPHOSPHATES, CALCIUM CARBONATE, AND MINERAL OIL
Louis Philip Mayrand, Winston-Salem, N.C., assignor to Extar Company, Paoli, Pa., a corporation of Pennsylvania
No Drawing. Filed May 19, 1966, Ser. No. 556,803
Int. Cl. A61k 7/16
U.S. Cl. 424—57          8 Claims This invention is that of a substantially water-free toothpaste containing a water-soluble unadjusted monovalent alkali-cation hexametaphosphate essential constituent substantially uniformly incorporated in a substantially stable carrier-abrasive predominately to completely of uncomposited submicron-sized calcium carbonate (in particles of from about 0.10 to about 0.35 micron) in a sufficient quantity of roughly about equal parts of a mineral oil of suitable viscosity range from about heavy to extra heavy, to provide a toothpaste of suitably extrudable consistency and user-acceptance manifested by absence of undesirably oily and greasy appearance and substantial freedom from separation or bleeding of oil while in the usual collapsible dispensing tube as well as when being used. The invention includes also the method of preparing these toothpastes.

The expression "alkali-cation," as addressed to a person of ordinary skill in this art, is used to cover as a cation the monovalent alkali metals sodium, potassium, and lithium along with the ammonium radical as a cation.

A preparation in powder form containing an admixture of trisodium salt of ethylenediamine tetraacetic acid with 5 parts of a mixture of about 80% of sodium hexametaphosphate and the balance of about equal quantities of sodium pyrophosphate and sodium tripolyphosphate has been in successful use for just over 10 years. However, it is limited by being confined to use in powder form, because of the instability of the sodium hexametaphosphate in the presence of water and its reversion to the corresponding meta and ortho phosphates with their increasing alkalinity and resulting inherent ineffectiveness.

In the investigation preceding and forming a part of the study leading to the present invention, attempts were made to prepare a water-free toothpaste incorporating sodium hexametaphosphate and the accompanying pyrophosphate and tripolyphosphate products of its preparation. However, liquid vehicles such as glycerine admixed with limited amounts of water and also glycerine alone, did not solve the problem and were inadequate because even glycerine without water, because of its high hygroscopic character, could not be relied on to avoid the instability of sodium hexametaphosphate and reversion to the meta and ortho phosphates.

Another aspect of that study involved using mineral oil as the liquid paste-forming ingredient and admixing with it the commonly available toothpaste quality calcium carbonate abrasive. Unfortunately, that resulted in useless toothpaste products which, because of the serious problem due to bleeding and also separation of the oil from the pasty mix, not only were too oily and thus greasy and unattractive but also unpleasant and disagreeable to use. That was caused by their providing too much free oil on the tooth brush with the accompanying mess and especially resulting discomfort in use due to presenting too much oil in the mouth, together with the additional problem of having to clean not only the oily tooth brush but also the oily wash basin.

Thus, there could not be obtained a practical toothpaste containing a suitable quantity of the sodium hexametaphosphate admixed with a toothpaste grade of precipitated chalk (i.e. calcium carbonate) incorporated in liquid petroleum or mineral oil, without undue and undesirable bleeding or separation of the oil from the solid ingredients of the paste or serious rod or plug formation in the collapsible dispensing tube.

The foregoing disadvantages, problems and shortcomings are overcome by the preparation of the toothpastes of this invention by incorporating a water-soluble hexametaphosphate as the essential constituent in a paste mix composed essentially of roughly about equal parts by weight of from about heavy mineral oil to about extra heavy mineral oil and substantially non-composited calcium carbonate of average particle size from about 0.10 to about 0.35 micron as an abrasive carrier (for the oil), up to one-third of which carrier may be replaced by another.

In its broadest aspect then, the toothpaste of the invention is substantially water-free and comprises by weight from about 0.5 to possibly about 10, but better to about 5, parts of unadjusted water-soluble monovalent alkali-cation hexametaphosphate admixed with from about 45 (plus or minus possibly 7 but practically about 5 and ideally about 2) parts of the aforesaid non-composited calcium carbonate and incorporated in about 45 (plus or minus possibly 7 but practically about 5 and ideally about 2) parts of a white mineral oil, running from heavy to extra heavy and having a specific gravity at 60° F. from about 0.870 to about 0.905 and a Saybolt viscosity at 100° F. of about 180 to about 495, and also with the solid ingredients and oil content so proportioned to one another to provide a product of acceptable toothpaste consistency and opacity, substantially free of separated oil and resistant to bleeding, to be readily extruded from an ordinary collapsible dispensing tube; which toothpaste is from substantially neutral to slightly alkaline to manifest an alkalinity below that which in use would harm the mucous membrane of the mouth, whereby a 1% suspension of the past in water shows a pH from about 6.9 to about 10.1, and beneficially from about 8 to about 9.

The expression "unadjusted hexametaphosphate" is used herein and in the appended claims broadly to embrace not only the unadjusted sodium hexametaphosphate currently available under the brand designation "Calgon" from Calgon Incorporated of Pittsburgh, Pa., which as currently commercially produced contains 67% $P_2O_5$ (total combined, slightly under the theoretical 69.1%), about 90% of sodium hexametaphosphate with the balance being varying to about equal parts of both sodium pyrophosphate and sodium tripolyphosphate, but also those products containing higher amounts up to about 100% of the hexametaphosphate, such as the sodium, potassium, lithium, or ammonium hexametaphosphate, or mixtures of any of them.

The water-soluble hexametaphosphate obviously is used in finely divided discrete particles, for example, the foregoing sodium hexametaphosphate is available in particles all of which pass through 200 mesh (particle size 74 microns) with a considerable part passing through 325 mash (particle size 44 microns).

The mineral oil ordinarily should be of U.S. Pharmacopeia or National Formulary quality. Within the above-noted specific gravity and viscosity ranges the mineral oil ingredient includes the white mineral oil heavy with specific gravity at 60° F. of 0.880 to 0.895 and Saybolt viscosity at 100° F. of 345 to 355 and also the white mineral oil extra heavy with specific gravity at 60° F. of 0.8899 and Saybolt viscosity at 100° F. of 495. The lower the viscosity of the mineral oil, the higher there needs to be the content of the submicron-sized calcium carbonate or that of the total solids content of it and any other solid ingredients. Alternatively, the higher the viscosity of the mineral oil, the lower it may be possible to have the calcium carbonate and other solids content and better the prospect of maintaining the continuity of the desired toothpaste.

The water-soluble hexametaphosphate also contributes its inherent detergent and emulsifying effect to enable preparing a useful toothpaste without including a separate detergent. However, to provide the foaming effect of the general run of toothpastes, it is desirable and advisable to include, say, from about 1 to about 2.5% of a compatible preferably low-foaming non-toxic in use wetting agent.

Such wetting agent can be any of the ordinary toothpaste soaps, or a synthetic such wetting agent such as an anionic wetting agent as an alkali metal salt of a sulfated higher aliphatic alcohol, such as one having 12 to 18 carbon atoms (as in U.S. Patent 2,128,917 page 1 column 2 last paragraph), beneficially about 2% of sodium lauryl sulfate; or a saturated higher aliphatic acyl sarcoside such as N-heptadecanoyl or N-stearoyl sarcoside and preferably their water-soluble salts such as those of an alkali metal as sodium or potassium, as sodium N-lauroyl sarcosinate, or an ammonia-derived radical as the ammonium, lower alkyl amine and alkylolamine salts. Such added wetting agent also is exemplified by sodium dioctyl sulfosuccinate, sodium coconut fatty acyl monoglyceride fulfonate, and others. In addition to providing the low-foaming common in toothpastes, such wetting agent serves to enhance the emulsification of the oil content of the toothpaste and the rinsing of it out of the toothbrush and the sink.

To provide the toothpaste with satisfactory toothpaste extrudable consistency and freedom from bleeding and separation of the abrasive particles from the oil, the precipitated calcium carbonate particles should be non-composited (sometimes called "uncomposited") and from about 0.1 to about 0.35 micron in size. These abrasive-carrier particles are, for example, acicular or also cubicle in shape and calcitic in structure.

Such uncomposited precipitated calcium carbonate crystals of the above-noted average size are prepared by gradually contacting calcium ions with carbonate ions in an aqueous medium maintained at pH of at least 8.5 with the calcium carbonate being formed and gradually precipitated as such crystals, while the aqueous solution and precipitated calcium carbonate crystals are subjected, until precipitation substantially has ended, to so-called anti-compositing forces sufficiently high and intense to provide and maintain substantially all of such crystals in a completely segregated condition within the reaction slurry maintained at from about 25° to about 60° C.

Such anti-compositing forces are produced by apparatus disclosed and described in U.S. Patent 2,619,330 of Nov. 25, 1952, by maintaining the differential peripheral speed between the inner circumferential periphery of the outer disc of the that apparatus and the adjacent outer circumferential periphery of its inner disc at at least about 1160 feet per minute. After precipitation is ended, the slurry is filtered, the precipitate washed substantially free of unreacted starting material and dried, and lightly crushed readily to disintegrate any light agglomerates into the individual crystals.

The content of such uncomposited precipitated calcium carbonate in the toothpaste may be varied within the further above-noted range, based on the required viscosity of the finished toothpaste. For example, a higher amount may be included to provide a higher consistency paste, say, for sale in the warmer climates; and alternatively, a lower amount may be used to provide a freer consistency toothpaste for sale in the colder climates.

Then too, part of this uncomposited calcium carbonate of from about 0.10 to 0.35 micron particle size, say, possibly up to about 35%, and practically to about 25%, and at times as with kaolin and bentonite, preferably about 10%, of it can be replaced by one or more compatible other toothpaste abrasives even though usually available in larger particle size such as colloidal kaolin, bentonite, water-insoluble inorganic calcium compound such abrasives as other precipitated calcium carbonate, dibasic or tribasic calcium phosphate, calcium sulfate, water-insoluble sodium metaphosphate, and also relatively water-insoluble such magnesium compounds as the oxide, hydroxide, carbonate, trisilicate, and dibasic and tribasic phosphate.

Such more abrasive agents thus are helpful in a special toothpaste formulation for use on highly stained teeth particularly by users who might be too impatient to await the removal of the stains from such highly stained teeth by a formulation lacking these more intense abrasives. In any event, the amount of such abrasive admixed with the uncomposited calcium carbonate should be below that which would upset the stability of the paste as to suitable extrudable consistency or cause bleeding or separation of oil and lead to user rejection of the formulation.

It is advantageous for the toothpaste to be more definitely on the alkaline side and, for example, within the range wherein a 1% aqueous dispersion of the toothpaste shows a pH of from about 8 to about 9.4. Toward that end such a more definitely alkaline embodiment of the invention contains an alkalizing agent miscible and compatible with the uncomposited calcium carbonate such as an inorganic magnesium compound antacid as magnesium oxide, magnesium hydroxide powder, magnesium carbonate, or magnesium trisilicate to the extent of from about 0.5 to about 5% magnesium oxide equivalent, or an equivalent amount of an alkali metal carbonate or bicarbonate as sodium bicarbonate, potassium bicarbonate, sodium carbonate, and potassium carbonate; or mixtures of any of these alkalizing agents.

In any event, the quantity used of the alkalizing agent obviously should be less than that which would provide in use in the mouth a pH harmful to the mucous membrane and oral tissues. Generally, it is advantageous to use the co-called heavy grade of the magnesium oxide and magnesium carbonate to the extent of 1 part of magnesium oxide to about each 4 parts of sodium hexametaphosphate. Including an alkalizing agent such as any of those embracing magnesium oxide serves to avoid the occurrence of any astringency with the users who otherwise manifest such idiosyncrasy to sodium hexametaphosphate, and at the same time manifests some control of its activity.

A further advantage to enhance retention of the mineral oil constituent in the toothpaste and prevent its bleeding and separation is obtained by including, to the extent of from about 0.5 to about 3%, a microfine silica gel of average particle size from about 2.9 to about 4 microns with surface area from about 300 to about 340 square meters per gram. Such silica gels are available under the brand designation "Syloid" 244, 75 and 73 produced by W. R. Grace & Co. Davison Chemical Division, of Baltimore, Md. Such added microfine silica gel manifests in addition a tendency to thicken the oil and at the same time to overcome any tendency to plugging or caking.

It is desirable to include in the toothpastes of the invention a natural or synthetic gum thickening agent to provide the paste with stability and body during brushing of the teeth, in an amount from about 0.5 to about 4% of the total depending upon the desired body for the paste to have during brushing of the teeth. A natural gum such as tragacanth, used in an amount of about 2%, gives the toothpaste a satisfactory body without too much gumminess and with some demulcent effect. Other natural gums such as acacia or agar-agar, or synthetic suspending agent as methylcellulose, similarly may be used. Such thickening agent gum and any wetting agent present jointly participate in emulsifying the mineral oil during the brushing of the teeth.

While the toothpastes of the invention generally manifest a bland taste, that can be enhanced by the addition of a suitable amount, based on the degree of sweetness desired, of a non-toxic sweetening agent such as from about 0.1 to about 0.2% of saccharin sodium, or a correspondingly smaller amount of sodium or calcium cyclohexanesulfamate.

Then to, suitable flavoring agents can be incorporated into the toothpaste to provide a suitable flavor, such as dry powdered flavors or flavoring oils, or mixtures of both of them. For example, dry powdered flavors, from about 0.5 to about 2.5% of the total paste, ordinarily incorporated in natural gums such as those noted above, act to emulsify the flavor into the oil base formulation and cooperate in its retention and in the body and in foaming properties of the paste when the teeth are being brushed. A small yet sufficient amount of flavoring oil, to the extent of from somewhere about 0.25% to about 1.5%, and optimally from about 0.7% to about 1%, also can be included if needed to improve the aroma of the toothpaste.

An important part of the invention is the finding that the toothpastes thereof can be prepared by a simple, direct and low cost process. Thus, in its broadest aspect the method of the invention comprises (a) mixing together all of any finely divided solid ingredients for the toothpaste, other than the uncomposited calcium carbonate, and then mixing their mixture together with the uncomposited calcium carbonate in an ordinary mixer adapted to mix materials of ointment consistency, such as the commonly used Pony mixer, (b) separately mixing into the mineral oil ingredient for the toothpaste any flavoring oil or oils to be included in it, (c) then adding the entire of said admixed oil content for the toothpaste to the admixed solid ingredients in their mixer; and (d) continuing to mix all of the so put together solid and oil ingredients for a time sufficient, in the order of about 20 minutes or a half hour or so, for them to be uniformly mixed to an ointment consistency.

For preparing a toothpaste of the invention of its desired qualitative content, the sodium hexametaphosphate and uncomposited submicron-sized precipitated calcium carbonate are used in their above-noted particle sizes respectively, and the same applies as to the microfine silica gel. All other finely divided solid materials are used in particle fineness suitable for use in toothpaste preparation as is known to those skilled in the art.

After weighing out the required quantities of the finely divided solid ingredients, it is desirable first to mix together intimately all of them other than the uncomposited submicron-sized calcium carbonate, and thereafter to admix the latter with the intimate mixture of the other solid ingredients.

The weighted quantity of flavoring oil is mixed thoroughly with the white mineral oil of the selected specific gravity and viscosity within the earlier above-noted range. Then their mixture is poured into the overall mixture of all of the solid ingredients contained in the mixer while its mixing arms are in motion. Mixing of the combined liquid and finely divided solid ingredients is continued for a sufficient time until they are at least intimately uniformly admixed and converted to a mixable paste of ointment consistency. It is desirable then to allow that paste to stand overnight, preferably while well covered, during which time the paste develops a slightly thinner consistency to allow its ready transfer to the tube filling machine in a suitable extrudable consistency for filling into collapsible tubes.

If these various ingredients are mixed thus at an ambient temperature below 80° F., the paste as thus obtained in ointment consistency, then is allowed to stand for a sufficient time, say, about a few or several hours, or, if it is about the end of the work day, then overnight, to adjust to a smooth, suitably extrudable toothpaste consistency. The paste then is ready to progress to the tube filling operation.

Alternatively, after all of the admixed solid and oil ingredients finally are brought to ointment consistency, their mixture can be allowed to stand overnight. Then it is mixed again for about 20 minutes or so thereby bringing it to a smoothly extrudable toothpaste consistency, at which condition it is ready for the tube filling operation.

An advantageous modification of the process involves initially heating either the admixed finely divided solids, or the oil content for the toothpaste, to at least about 80° F. or such higher temperature, say, from about 130° to 140° F. or somewhat higher, that when either said mixed solids or said oil content is mixed with the other of them the resulting mixture of both of them then will be at from about 80° F. or up to about 130° to 140° F.

Alternatively, both (i) the admixed finely divided solids and (ii) the oil content for the paste can be heated separately to at least about 80° F. and then mixed together. It is advantageous, however, to heat merely the mixture of dry ingredients at least above 80° F. and beneficially to at least from about 130° to about 140° or somewhat higher, and then to add the oil content to this so heated solid mix.

In any event, in using any one of the foregoing alternative preliminary heating treatments, when the final mixture of both the oil content with the admixed solid ingredients is completed at the end of the 20 minutes or half hour mixing time sufficient to bring them to uniform mix and to ointment thickness, the resulting paste is of smoothly extrudable tooth paste consistency and ready to go on to the mechanical tube filling operation.

In all of the foregoing mixing steps after the oil and solid constituents are mixed, the resulting paste is readily mixed without running into any difficulty such as having air whipped into the finally resulting paste which then lends itself smoothly to the mechanical tube filling operation and to ready rinsing off of any residues from the equipment.

The toothpastes of the invention and the embodiments of the method for producing them are illustrated by, but not restricted to, the following examples:

Example 1.—Hexametaphosphate, calcium carbonate, and mineral oil 4 grams of finely powedered saccharin sodium, and 20 grams of finely powdered stabilized dry mint flavor, are mixed with 160 grams of sodium hexametaphosphate; and the resulting mixture is added to and mixed in a Pony mixer with 1944 grams of the uncomposited submicron-sized calcium carbonate. 34 grams of mint flavoring oils are mixed uniformly into 1838 grams of heated special extra heavy white mineral oil of page 5 lines 10 and 11 (temperature 122° F.), and their mixture is added to the earlier mentioned mixture of finely divided solid materials in the Pony mixer. The overall charge of mixed oils and mixed solid materials are agitated in the Pony mixer for about 35 minutes until the mixed oils and solid materials are converted into a homogeneous, smooth and coherent paste or toothpaste consistency. That resulting toothpaste then is ready for transfer to the collapsible tube filling machine.

Example 2.—Hexametaphosphate, calcium carbonate, magnesium oxide, and mineral oil The respectively same quantities of sodium hexametaphosphate, saccharin sodium, and powdered dry mint flavor as used in Example 1, and 40 grams of magnesium oxide U.S.P. heavy are mixed together and their mixture then is mixed with 1904 grams of the same uncomposited calcium carbonate; and the resulting mixture is heated in an oven to 135° F. and then charged into a Pony mixer. 34 grams of the same mint flavoring oils are mixed uniformly into 1838 grams of the same special extra heavy mineral oil of Example 1, and their mixture is added completely to the mixture of finely divided solid materials in the Pony mixer. The resulting overall charge of solids and oils is mixed in the same way for substantially the same time as in Example 1 and results in a homogeneous, smooth coherent paste of toothpaste consistency, ready then for filling into collapsible tubes.

Example 3.—Hexametaphsphate, silica gel, calcium carbonate, and mineral oil 40 grams of microfine silica gel (average particle size of 3.3 microns and surface area of 300 square meters per gram, e.g. Davidson Chemical Division "Syloid" 244) were admixed with the same quantities of sodium hexamethaphosphate, saccharin sodium, and finely powdered dry mint flavor as respectively used in Example 2, and the resulting mixture then was mixed with 1904 grams of the same uncomposited submicron-sized precipitated calcium carbonate, and the resulting mixture heated in an oven to 130° F. and then transferred to a Pony mixer. Separately 34 grams of the mint flavoring oils were mixed into 1838 grams of the same special extra heavy mineral oil of the earlier examples. That mixture of oils was added completely to the heated mixture of the solid ingredients in the Pony mixer; and then that overall charge of the mixed oils and solid ingredients was mixed in the same way as in Example 2, resulting in a toothpaste ready to be filled into collapsible tubes.

Example 4.—Hexametaphosphate, magnesium oxide, silica gel, calcium carbonate, and mineral oil 40 grams of magnesium oxide heavy, and 40 grams of the microfine silica gel used in Example 3 are mixed with the same weights of sodium hexametaphosphate, saccharin sodium, and finely powdered dry mint flavor as used respectively in Example 1, and the mixture of them then was mixed uniformly into 1884 grams of the same uncomposited submicron-sized calcium carbonate. The resulting mixture of solids was heated in an oven to 130° F. and then loaded into the Pony mixer. Separately 34 grams of the mint flavor oil were mixed with 1818 grams of the special extra heavy mineral oil of the earlier examples, and this mixture of oils then was added completely to the heated mixture of the solids ingredients in the Pony mixer. The overall charge of the mixed oils and solid ingredients then was mixed in the same way as in Example 2, resulting in a toothpaste ready to be filled into collapsible tubes.

Example 5.—Hexametaphosphate, tragacanth, wetting agent, calcium carbonate, and mineral oil 40 grams of finely powdered tragacanth, and 80 grams of finely divided sodium lauryl sulfate U.S.P. were admixed with the same amounts of sodium hexametaphosphate, saccharin sodium, and dry powdered mint flavor as used respectively in Example 1. This mixture of solid ingredients then was mixed uniformly with 1864 grams of the same uncomposited submicron-sized calcium carbonate, and the resulting mixture of the solid ingredients was heated in an oven to 135° F. and then charged into a Pony mixer. Separately 34 grams of the same mint flavoring oils were mixed uniformly into 1798 grams of the same special extra heavy mineral oil used in Example 1. This mixture of oils then was added completely to the heated mixture of the solid ingredients in the Pony mixer. The overall charge of the mixed oils and solid ingredients then was mixed in the same way as in Example 2, resulting in a toothpaste ready to be filled into collapsible tubes.

Example 6.—Hexametaphosphate, magnesium oxide, calcium carbonate, tragacanth, wetting agent, and mineral oil 40 grams of the magnesium oxide heavy are added to and admixed with the same amounts of hexametaphosphate, tragacanth, sodium lauryl sulfate, saccharin sodium, and dry powdered mint flavor as used respectively in Example 5, and their mixture is mixed uniformly into 1844 grams of the same uncomposited submicron-sized calcium carbonate; and the resulting mixture of solid ingredients is heated in an over to 135° F. and then charged into the Pony mixer. Separately 34 grams of the mint flavoring oils are mixed uniformly into 1778 grams of the special extra heavy mineral oil used in Example 1. The overall charge of the mixed oils and solid ingredients then are mixed in the same way as in Example 2, resulting in a toothpaste ready to be filled into collapsible tubes.

Example 7.—Hexametaphosphate, silica gel, tragacanth, wetting agent, calcium carbonate and mineral oil Example 6 is repeated in all respects except that its 40 grams of magnesium oxide are replaced entirely by 40 grams of the same microfine silica gel as was used in Example 3.

Example 8.—Hexametaphosphate, magnesium oxide, silica gel, tragacanth, wetting agent, calcium carbonate, and mineral oil 40 grams of the same microfine silica gel as was used in Example 3 is added to and admixed with the same amounts of sodium hexametaphosphate, magnesium oxide heavy, tragacanth, sodium lauryl sulfate, saccharin sodium, and dry finely powdered mint flavor as were used respectively in Example 6, and the resulting mixture was added to and uniformly mixed with 1824 grams of the same uncomposited submicron-sized calcium carbonate. The resulting mixture of solid ingredients was heated in an over to 130° F. and then loaded into the Pony mixer. Separately 34 grams of mint flavoring oils were mixed uniformly with 1758 grams of the same special extra heavy mineral oil as used in Example 1. The overall charge of the mixed oils and solid ingredients then was mixed in the same way as in Example 2, resulting in a toothpaste ready to be filled into collapsible tubes.

Example 9.—Hexametaphosphate, sodium bicarbonate, tragacanth, wetting agent, calcium carbonate, and mineral oil 120 grams of sodium hexametaphosphate, 60 grams of tragacanth USP powder, 80 grams of sodium lauryl sulfate USP, 32 grams of sodium bicarbonate USP powder, 4.8 grams of saccharin sodium USP powder, and 40 grams of spray-dried mint flavor powder are mixed together and then added to and admixed with 1740 grams of the uncomposited submicron-sized calcium carbonate USP in a Pony mixer. Separately 11.2 grams of mint flavoring oils are uniformly mixed into 1912 grams of white mineral oil heavy (see column 2, line 63), and their mixture is added completely to the mixture of solid ingredients in the Pony mixer. The overall charge of the oils and solid materials then are mixed for about 35 minutes into a homogeneous, coherent mass of ointment consistency. It is then covered over and left to stand overnight. It is then stirred again for about 20 to 30 minutes and converted thus into a homogeneous, smooth and coherent tooth paste consistency ready then for transfer to the collapsible tube filling machine.

Example 10.—Hexametaphosphate, magnesium oxide, wetting agent, calcium carbonate, and mineral oil 200 grams of sodium hexametaphosphate, 80 grams of magnesium oxide USP heavy, 80 grams of sodium lauryl sulfate USP powder, 6 grams of saccharin sodium fine powder, 60 grams of dry mint flavor powder are mixed and added to 1620 grams of the uncomposited submicron-sized calcium carbonate in the mixer. Separately 20 grams of mint flavoring oils are admixed uniformly with 1934 grams of the white mineral oil heavy as used in Example 9, and their mixture is added completely to the earlier mixture of solid ingredients in the mixer. The overall charge of oil and solid ingredients then is mixed together covered tightly, allowed to stand overnight, and then mixed again, all in the same way as described in Example 9, resulting then in a finished toothpaste ready for filling into collapsible tubes.

Example 11.— Tooth paste with calcium carbonate partly replaced by kaolin 200 grams of sodium hexametaphosphate, 100 grams of the magnesium oxide heavy, 40 grams of tragacanth, 80 grams of sodium lauryl sulfate, 6 grams of saccharin sodium, and 100 grams of dry mint flavor powder are mixed together and added to and uniformly admixed with a mixture of 1512 grams of uncomposited submicron-sized calcium carbonate and 168 grams of colloidal kaolin. Separately 20 grams of mint flavor oil are uniformly mixed into 1774 grams of the white mineral oil heavy as used in Example 9. This oil mixture is added entirely to the mixture of all of the solid ingredients in the mixer, wherein the overall charge of the oils and admixed solid ingredients are mixed, left to stand overnight, and again mixed, all as described in Example 9, resulting in a finished toothpaste ready for filling into collapsible tubes.

Example 12.—Low calcium carbonate, high mineral oil 240 grams of sodium hexametaphosphate, 120 grams of magnesium oxide heavy, 80 grams of sodium carboxymethylcellulose, 80 grams of sodium lauryl sulfate, 6 grams of saccharin sodium powder, and 40 grams of dried mint flavor powder are admixed together and added to and admixed with 1460 grams of uncomposited submicron-sized calcium carbonate in a Pony mixer. Separately 40 grams of mint oil flavor are admixed uniformly in 1934 grams of the same heavy white mineral oil used in Example 9, and their mixture is added to the earlier mixture of all of the solid ingredients. This overall charge of the mixed oils and mixed solid ingredients is mixed together, left to stand overnight, and then mixed again, all in the same way as described in Example 9, resulting in a homogeneous, smooth and coherent toothpaste ready for filling into collapsible tubes.

Example 13.—High calcium carbonate, low mineral oil 160 grams of sodium hexametaphosphate, 40 grams of magnesium oxide heavy, 40 grams of the same silica gel as used in Example 3, 40 grams of finely divided tragacanth, 80 grams of sodium lauryl sulfate, 6 grams of saccharin sodium, and 20 grams of dried mint flavor powder, are mixed together and thus admixed with 2000 grams of uncomposited submicron-sized calcium carbonate, and their mixture is heated in an oven at 130° F. and then charged into a Pony mixer. Separately 34 grams of mint flavor oil are admixed uniformly into 1580 grams of the same special extra heavy mineral oil as used in Example 1. This mixture of these two oils is added to the mixed solid ingredients. The joint overall charge then is mixed in the mixer for 35 minutes, resulting in a smooth, homogeneous and coherent toothpaste ready for filling into collapsible tubes.

The sodium hexametaphosphate of any of the examples can be replaced in part or as a whole by any other of the hereinabove identified alkali-cation hexametaphosphate, or by the equivalent of the corresponding adjusted hexamethaphosphate. So also, each of the saccharin sodium, and dried mint flavor powder and mint flavoring oils, can be replaced in whole or in part by any other suitable sweetening agent, flavoring powder, or flavoring oil respectively, compatible with the other ingredients. Then too, the magnesium oxide of any of Examples 2, 4, 6, 8 and 10 can be replaced in part or as a whole by any other of the hereinabove named suitable alkalizing agents, any of which along with the magnesium oxide can replace in part or as a whole the soduim bicarbonate of Example 9.

The sodium lauryl sulfate wetting agent of any of the Examples 5 through 13 can be replaced in part or as a whole by any other compatible wetting agent indicated or named earlier above so long as it is compatible with the other ingredients. Likewise, the tragacanth bodying agent of Examples 5 through 9, 11 and 13 can be replaced in part or as a whole by any other bodying agent of any other example earlier identified herein. Then also, the specific silica gel of Examples 3, 4, 7, 8 and 13 can be replaced in part or as a whole by any other silica gel within the range of properties earlier above disclosed. Any of them also can be included, in a suitable amount within the disclosed range, in any other of these formulations to enhance their resistance to bleeding and oil separation.

While the earlier above identified uncomposited submicron-sized precipitated calcium carbonate is essential to providing a satisfactorily stable and effective toothpaste containing a content of an alkali-cation hexametaphosphate, as noted by Example 11 that calcium carbonate can be replaced in the formulations of the various examples in part only and not in excess of about 35% by any other of the toothpaste abrasive agents earlier hereinabove named.

Similarly, either of the specific heavy white mineral oil or special extra heavy mineral oil of the respective examples can be replaced by the other of them or by any other equivalent such mineral oil within the earlier above recited range of specific gravity and Saybolt viscosity.

Accordingly, all of the possible modifications of any other specific examples provided by substitution in the manner just above recited (after the end of the Example 13) are to be considered as if fully set forth as individual examples without specifically reciting each of them in detail, thereby to avoid unduly prolonging this specification. Simple laboratory test batches may need to be prepared to allow for such minor adjustment as to some one or more of the applicable ingredients to formulate other suitable toothpaste formulations within the scope of this disclosure.

For example, the hexametaphosphate content may be varied. The higher its content, the more may be the need for an alkalizing agent, for as the hexametaphosphate approaches and exceeds 5% the more noticable to some individuals may be its astringency whereby a higher content of magnesium oxide or other alkalizing agent may be desirable. In some cases calcium carbonate or silica gel additions may be needed to adjust the consistency or a reduction in either of them, or similar change in content of some other ingredient, may appear advisable.

The amount of flavoring oil content included generally is to be considered along with the mineral oil content as part of the total oil content of the individual formulation. For a toothpaste formulation for use in a cold climate, the higher may need to be the oil content, for example, as in Example 12. Conversely for a toothpaste for use in a warmer climate, the lower should be the oil content, for example, as in Example 13. In general, the toothpastes of the various complete examples are stable over a very wide range of temperature from about freezing to the generally hot summer temperatures, even above 100° F.; and the toothpaste remains cohesive and plastic as low as 32° F. and even below.

While the invention has been explained by detailed descriptions of certain specific embodiments of it, it is understood that various changes or substitutions may be made in any of them within the scope of the appended claims which are intended also to cover equivalents of the various embodiments.

What is claimed is:

1. A substantially water-free toothpaste comprising by weight about 4 parts of unadjusted water-soluble sodium hexametaphosphate, one part of magnesium oxide heavy, about one part of microfine silica gel of average particle size of from about 2.5 to about 4 microns, about one part of tragacanth, about two parts of sodium lauryl sulfate, and about 45.6 parts of uncomposited submicron-sized calcium carbonate, all uniformly incorporated in about 44 parts of special extra heavy mineral oil having a specific gravity of 60° F. of about 0.8899 and Saybolt viscosity at 100° F. of about 495.

2. A substantially water-free toothpaste comprising by weight.
   - (a) from about 0.5 to about 10 parts of a water-soluble monovalent alkali-cation hexametaphosphate admixed with
   - (b) from about 36.5 to about 50 parts of uncomposited submicron-sized calcium carbonate of from about 0.1 to about 0.35 micron particle size, from none to about 35% of the weight of said calcium carbonate being at least one other compatible toothpaste abrasive incorporated in
   - (c) from about 38 to about 50 parts of a mineral oil having a specific gravity at 60° F. from about 0.870 to about 0.905 and a Saybolt viscosity at 100° F. of about 180 to about 495; with the total solid ingredients and oil content so proportioned to one another to provide the finished product with acceptable toothpaste consistency and substantial freedom from separated oil.

3. A toothpaste as claimed in claim 2, wherein also incorporated therein to the extent of from about 0.5 to about 3% by weight of the toothpaste is a microfine silica gel of average particle size of from about 2.5 to about 4 microns.

4. A toothpaste as claimed in claim 2, wherein there also is incorporated therein from about 0.5 to about 4% by weight thereof of a compatible toothpaste thickening agent to provide the toothpaste with suitable stability and body during brushing of the teeth.

5. A toothpaste as claimed in claim 2, wherein there also is incorporated therein a compatible finely divided toothpaste-suitable wetting agent in an amount sufficient to provide a suitable degree of foaming during brushing of the teeth.

6. A toothpaste as claimed in claim 2, wherein also incorporated therein is a compatible alkalizing agent which is a member of the class consisting of an inorganic magnesium compound antacid, sodium bicarbonate, sodium carbonate, potassium bicarbonate, and potassium carbonate, and in a quantity below that which would provide in use in the mouth a pH harmful to the mucous membrane and oral tissues.

7. A toothpaste as claimed in claim 6, wherein the alkalizing agent is magnesium oxide included to the extent of from about 0.5 to about 5% by weight of the toothpaste.

8. The method of preparing a substantially water-free toothpaste as claimed in claim 1, which method comprises mixing the alkali-cation hexametaphosphate together with any other fiinely divided solid ingredients for the toothpaste other than the uncomposited submicron-sized calcium carbonate, adding said resulting first solids mixture to and admixing it with said calcium carbonate to provide a final solids ingredient; mixing into the mineral oil any flavoring oil to be included to give the toothpaste a desired flavor; heating at least one constituent member of the class consisting of (a) said resulting admixed oil ingredient and (b) said final solids ingredient to a temperature such that when the constituents (a) and (b) are admixed the resulting overall mixture has a temperature from about 80° to about 130° F.; adding said oil ingredient to the final solids ingredient; and then mixing said final solids ingredient and oil ingredient for a time sufficient to mix them uniformly and provide said overall mixture of them with ointment consistency.

References Cited
UNITED STATES PATENTS 2,216,816  10/1940  Kuever _____ 167—93

RICHARD L. HUFF, Primary Examiner